Sept. 12, 1961 J. M. OSTBERG ET AL 2,999,723
CHAIN FOR TRACTORS
Filed May 31, 1956 2 Sheets-Sheet 2

United States Patent Office 2,999,723
Patented Sept. 12, 1961

2,999,723
CHAIN FOR TRACTORS
Jonas Martin Ostberg and Carl Viktor Larsson,
Alfta, Sweden
Filed May 31, 1956, Ser. No. 588,373
Claims priority, application Sweden June 15, 1955
1 Claim. (Cl. 305—57)

The present invention relates to endless band tracks for tractors provided with rubber tired wheels, each track consisting of an endless chain of links and each link consisting of two plates which are spaced apart laterally with respect to the direction of movement of the endless track and united by transverse bars. It is an important feature of the invention that such bars are formed to fit the convex tread of the tire and are adapted to guide the endless track laterally relatively to the tires of the tractor by engaging notches provided in the tires for that purpose.

An embodiment of the invention is illustrated by way of example in the accompanying drawings, wherein.

Figure 3:
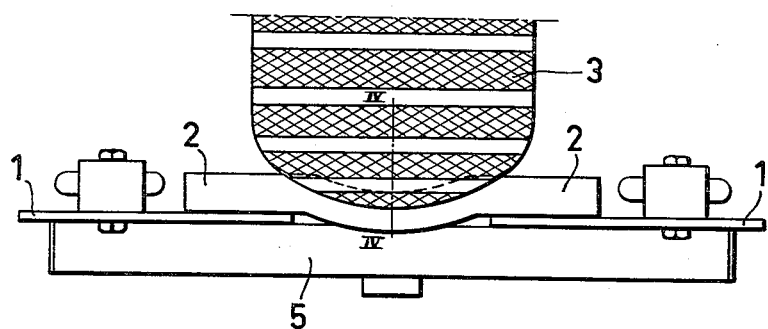
FIGURE 3 is a cross sectional elevation showing a link in engagement with a tire, and as seen from the front.
Figure 4:
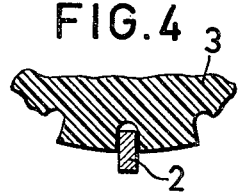
FIGURE 4 is a fragmental cross section on the line IV—IV of FIGURE 3.

In the drawing, each link of an endless track comprises two plates 1 which are spaced apart laterally with respect to the direction of movement of the track, and united by means of gripping bars 2 extending to each side of a wheel tire 3, as seen in FIGURE 3. The gripping bars 2 are adapted to engage notches in the tire 3, provided for that purpose. It will further be seen from FIGURE 3 that the gripping bars 2 are formed with arcuate or concave middle parts (whose planes are normal to plates 1) to match the convex tread of the tire 3, whereby the endless track is guided laterally relatively to the tire 3. At the same time, the engagement between the bars 2 and the tire 3 is made firmer and the length of the line of engagement between the tire and each bar 2 is increased. Furthermore, as shown in FIG. 4, the notches and bars have cross-sections which substantially correspond.

Figure 1:
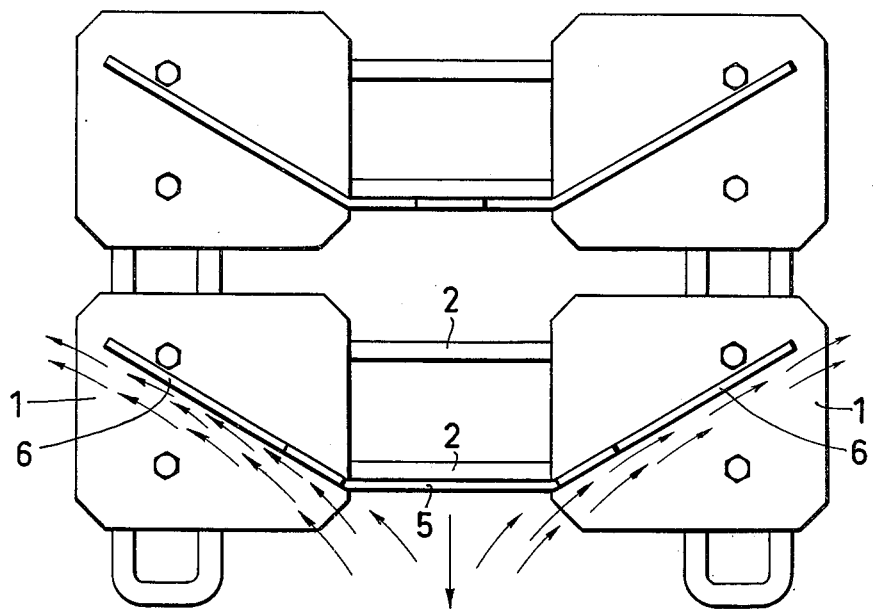
FIGURE 1 is a plan view of two of the links of an endless track as seen from the outside thereof.
Figure 2:
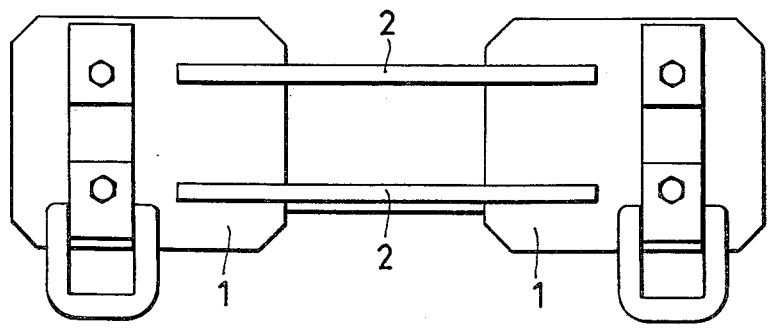
FIGURE 2 is a plan view of a link as seen from the inside of the endless track.

At the outside of the endless track band, each link is provided with a wedge-shaped gripping flange 5 placed on edge and rigidly connected, at its opposite end portions, to the two plates 1 of the related link. The end portions 6 of the flange 5, that are connected with the plates 1, extend substantially diagonally over the plates, as seen in FIGURE 1. Through this plough-like disposition of the end portions 6 of the flange 5 the advantage is gained that the track, during travel, is continuously self-cleaning, as the earth is pushed outwardly to the sides of the track, as indicated by the arrows on FIGURE 1, so that it does not become clogged between the links. Furthermore, the engagement of each link with the ground is gradual or progressive as a result of the oblique disposition of the end portions 6. As a result the endless track runs smoothly, and thus shaking or vibration is reduced to a minimum, which is of great importance, particularly on snowy, sticky or clayey ground and at higher speeds (40 kilometres per hour or more).

The endless track according to the invention is of stable construction and is characterized by a great gripping ability both in relation to the rubber tired wheels and the ground. Owing to the simple construction it is easy to change the links of a track.

What we claim is:

In a tractor drive, the combination of a track comprising interconnected links, and a rubber tire having a tread adapted to accommodate said links, each link being constituted by two coplanar plates spaced transversely of said tire by a distance substantially corresponding to the width of the tread of said tire, parallel spaced bars of rectangular cross-section aligned transversely of said tread and interconnecting said plates, said plates having flat surfaces facing said tread, said bars being secured to said flat surfaces, the tread being provided with grooves and extending transversely throughout the tread for accommodating said bars and having a width substantially equal to the thickness of said bars and having a peripheral spacing substantially equal to the spacing of the two parallel bars, and pivotable loops on the rigidly interconnected plates for connection to another of said links.

References Cited in the file of this patent

UNITED STATES PATENTS

| 1,521,454 | Linn | Dec. 30, 1924 |
| 1,560,225 | Filleul | Nov. 3, 1925 |
| 1,587,097 | White | June 1, 1926 |
| 1,942,337 | Kennedy | Jan. 2, 1934 |
| 2,458,755 | Waller | Jan. 11, 1949 |
| 2,470,801 | Boltman | May 24, 1949 |
| 2,707,658 | Grenier | May 3, 1955 |
| 2,712,964 | Waller | July 12, 1955 |
| 2,719,758 | Proske | Oct. 4, 1955 |
| 2,738,236 | Haushalter | Mar. 13, 1956 |
| 2,739,017 | Arps | Mar. 20, 1956 |
| 2,755,146 | Galanot | July 17, 1956 |
| 2,770,977 | Beckadolp et al. | Nov. 20, 1956 |

FOREIGN PATENTS

| 483,846 | Canada | June 10, 1952 |